UNITED STATES PATENT OFFICE.

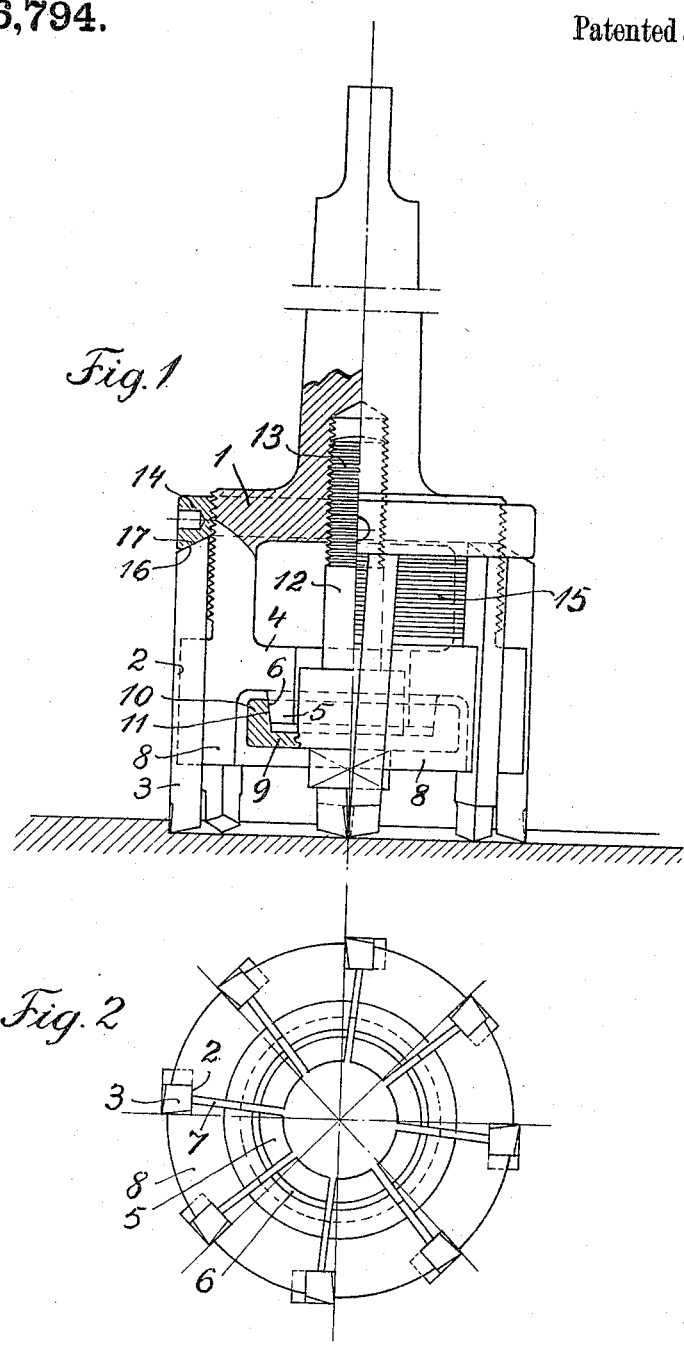

OSKAR JOHANSEN, OF CHRISTIANIA, NORWAY.

MILLING-CUTTER HEAD.

1,186,794. Specification of Letters Patent. Patented June 13, 1916.

Application filed June 30, 1915. Serial No. 37,252.

*To all whom it may concern:*

Be it known that I, OSKAR JOHANSEN, a subject of the King of Norway, residing at Christiania, Norway, have invented certain new and useful Improvements in Milling-Cutter Heads, of which the following is a specification.

It is the object of the present invention to provide means for gripping or engaging the cutters in a reliable manner and so as to be readily detachable.

A still further object is to provide means for effecting the simultaneous and uniform adjustment of the cutters.

Yet a still further object is to give the cutters the required backwardly leaning position in the direction of rotation of the head so as not to have to deform the cutter to produce the cutting edge.

With these and other objects in view reference is made to the below specification and to the appended drawing, in which is illustrated an embodiment of my invention, Figure 1 showing head with cutters in elevation, partly in section, and Fig. 2 is end view of same with binding disk removed.

The cutter-head is made in the shape of a hollow cylinder 1. Said cylinder has on its circumference a number of channels or grooves 2 extending longitudinally of the cylinder but slightly diverging from its axis. Said channels or grooves are adapted to receive the cutters 3. The cylinder is on the inside provided with a projection 4 extending around its interior surface, and on said projection is provided an annular flange 5 with a tapering surface 6 like a cone. Now in order to effect the gripping of the cutters in the said channels the head is split by radial cuts 7 at the bottom of the channels, said cuts extending to the bottom of the cylinder whereby sector-portions 8 are produced which will feather sufficiently to allow said portions to be driven toward the center of the head. For this purpose I have devised a disk 9 having an annular flange 10, said flange being provided with an inside tapering surface 11 adapted to engage the above named tapering surface 6. The disk 9 is secured to or made in one piece with a screw bolt 12 to be screwed into a screw threaded bore 13 in the bottom of the head. By screwing the bolt 12 into said bore 13 the disk 9 with its taper-surface 11 is forced against the taper-surface 6 of the sectors 8 and thereby said sectors are driven toward the center of the head and consequently a gripping action is exerted on the cutters 3 by the channel-sides.

The means for adjusting the cutters consists of a screw-threaded ring 14 which is adapted to be screwed on the threaded portion 15 of the cutter-head, said ring serving as an abutment for the ends of the cutters so that by screwing said ring along the head all of the cutters are adjusted simultaneously.

As the cutters during the working operation has a tendency to turn on the edge of the cylinder the ends of the cutters are tapered as at 16 and the abutting surface of the ring is also tapered as at 17 so as to engage the cutter-ends and thereby prevent the turning of the cutters.

Having now described my invention what I claim is:—

1. In a cutting tool of the character described, the combination of a slotted head having radial tapering channels in its periphery, cutters in said channels, a projection in the interior of said head, an annular flange on said projection having a conical face, sectors formed in the head at the bottom of said channels, a disk, an annular flange on said disk provided with a tapering face, means for bringing this tapering face face in engagement with the conical face of said projection for gripping the cutters, means for adjusting said cutters, and means for preventing a turning of the same.

2. In a cutting tool of the character described, the combination of a slotted head having radial tapering channels in its periphery, cutters in said channels, a projection in the interior of said head, an annular flange on said projection having a conical face, sectors formed in the head at the bottom of the channels, a disk, an annular flange on said disk provided with a tapering face, a screw bolt integrally made with said disk and adapted to enter a bore in the head for bringing the tapering face in engagement with the conical face of said projection for gripping the cutters between the channel walls, a screw threaded ring adapted to be screwed on the cutter head and to serve as an abutment for the end of the cutters for allowing an adjustment of the same, and means for preventing the turning of said cutter.

In testimony whereof I affix my signature in presence of two witnesses.

OSKAR JOHANSEN.

Witnesses:
N. G. TAUDBERG,
HEDVIG STEFFENS.